United States Patent [19]

Kaneko

[11] Patent Number: 5,067,026

[45] Date of Patent: Nov. 19, 1991

[54] APPARATUS FOR RECORDING AND REPRODUCING A VIDEO SIGNAL

[75] Inventor: Shinji Kaneko, Kanagawa, Japan

[73] Assignee: Sony Corporation, Tokyo, Japan

[21] Appl. No.: 344,827

[22] Filed: Apr. 28, 1989

[30] Foreign Application Priority Data

| May 6, 1988 | [JP] | Japan | 63-110088 |
| May 16, 1988 | [JP] | Japan | 63-118608 |

[51] Int. Cl.⁵ .......................... H04N 5/21; H04N 9/80
[52] U.S. Cl. ..................... 358/340; 358/310; 358/314; 358/330
[58] Field of Search ............... 358/337, 340, 328, 330, 358/320, 310, 12

[56] References Cited

U.S. PATENT DOCUMENTS

| 4,007,483 | 2/1977 | Pham van Lang | 358/330 |
| 4,345,222 | 8/1982 | Cunningham | 333/28 R |
| 4,477,837 | 10/1984 | Asada | 358/310 |
| 4,510,530 | 4/1985 | Miura et al. | 358/314 |

FOREIGN PATENT DOCUMENTS

| 62-122384 | 6/1987 | Japan | 358/330 |
| 61-193584 | 8/1987 | Japan | 358/340 |

OTHER PUBLICATIONS

Beeching, Steve, "Domestic Videocassette Recorders" Butterworth E. G., 1983, pp. 30–31.

Primary Examiner—Roy N. Envall, Jr.
Assistant Examiner—Huy Nguyen
Attorney, Agent, or Firm—Alvin Sinderbrand; William S. Frommer

[57] ABSTRACT

In a recorder system for recording a video signal, the video signal is modulated by a sine wave FM modulator and is then fed to a delay equalizer for successively rotating a phase of the modulated video signal so that a phase of high order side band components of the modulated video signal is shifted by 180 degrees relative to each other, and is then recorded on a video tape having a characteristic as a limiter. Hence, a moire component can be reduced. In a reproducing system, a reproduced video signal is fed to a filter circuit having a serially-connectred limiter and high-pass filter, a low-pass filter connected parallelly to the limiter, and an adder for adding an output signal of the high-pass filter and an output signal of the low-pass filter. A plurality of the filter circuits are serially connected so that the signal-to-noise ratio (S/N ratio) can be improved.

2 Claims, 7 Drawing Sheets

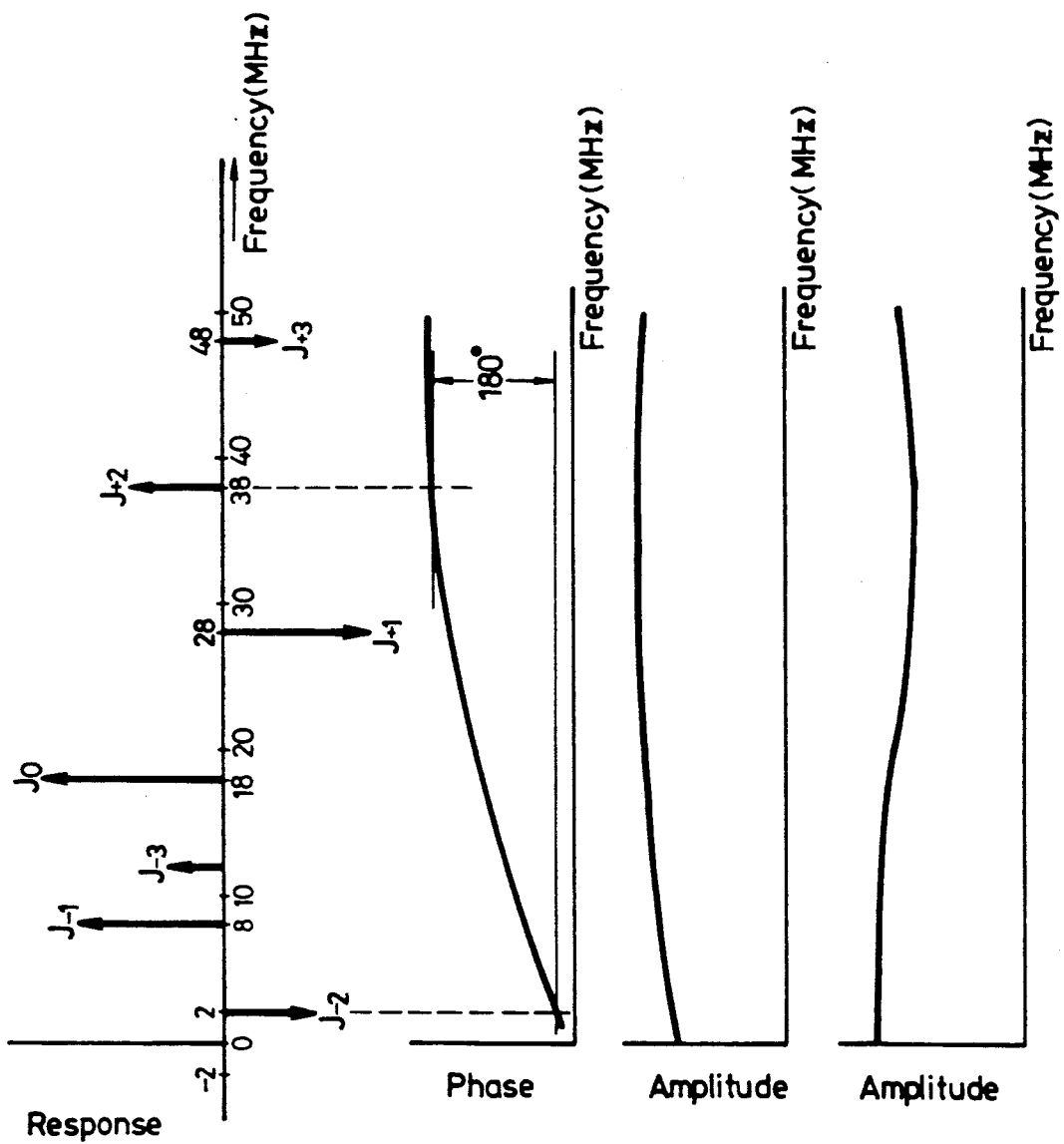

APPARATUS FOR RECORDING AND REPRODUCING A VIDEO SIGNAL

BACKGROUND OF THE INVENTION

1. Field of the Invention

This invention relates generally to an apparatus for recording and reproducing a video signal, and more particularly, to an improvement of a recording circuit and a reproducing circuit.

2. Description of the Prior Art

In a known video tape recorder (VTR), a luminance signal is recorded in the form of an FM signal. In a video signal according to the so-called high definition vision system, the luminance signal has a bandwidth of 10 MHz. If this luminance signal of 10 MHz is frequency modulated on a carrier having the frequency of, for example, 18 MHz, then second and third side band components thereof caused by this modulation are folded with respect to the center frequency so as to fall within a band of a first side band component. Accordingly, if the FM signal is demodulated under such a state, there is produced a moire component by the folded portions, resulting in deterioration of the image quality.

FIG. 1A shows the folded state wherein, $J_0$ represents a carrier, $J_{\pm 1}$ first side band components, $J_{\pm 2}$ second side band components and $J_{\pm 3}$ third side band components. In this case, the upper and lower side bands of the same side band components are equal to each other in level, but their phases are inverted.

In order to suppress the occurrence of a moire component, the assignee of the present application has previously proposed (see Japanese patent application No. 61-282671) that the phase of the undesired side band components, for example, the upper side band $J_{+2}$ or the or the lower side band $J_{-2}$ of the second side band components $J_{\pm 2}$, be rotated to remove the second side band components $J_{\pm 2}$.

It appears that the above-mentioned proposal is effective because the side band components of the FM signal in which the phases of the upper and lower side bands of the same side band components are inverted relative to each other, as shown in FIG. 2A, are not removed by a limiter, as shown in FIG. 2B. On the other hand, the side band components of the AM signal in which the phases of the upper and lower side bands of the same side band components are equal, as shown in FIG. 3A, can be removed by the limiter, as shown in FIG. 3B.

According to the above-mentioned proposal in which the phase of only the upper side band or the lower side band of the undesired side band components is rotated, it is possible to suppress only the moire component caused by a specific narrow band, for example, the second side band components $J_{\pm 2}$. The problem then is that, when the phase of the side band in the specific narrow band is rotated, a direct current component occurs in a reproduced signal. This direct current voltage (DC voltage) component results in distortion of the reproduced image.

A defect of a prior art reproducing circuit will now be explained with reference to FIG. 4 in which an FM video signal is reproduced from a magnetic tape 1 by a magnetic reproducing head 2 and is supplied through a playback amplifier 3 to an equalizer 4. In the reproduced FM signal supplied to the equalizer 4, the level of lower side band component $J_{-1}$ is substantially as high as that of carrier $J_0$ as shown in FIG. 5A. The condition $J_0 \leq J_{-1} \times 2$ causes a so-called overmodulation, which causes the equalizer 4 to attenuate the level of the lower side band component $J_{-1}$ as shown in FIG. 5B. In FIGS. 5A and 5B, $J_{+1}$ represents the upper side band component and the hatched portion N represents the noise. When the equalizer 4 attenuates the level of the lower side band component $J_{-1}$, the level of the noise N on the lower side band is attenuated accordingly.

Referring back to FIG. 4, the output signal of the equalizer 4 is supplied through a limiter 5 to an FM-demodulator 6, and a reproduced video signal is developed at an output terminal 7 that is supplied from the output side of the FM-demodulator 6.

The noise N contained in the reproduced video signal has a triangular characteristic, that is, the level is increased in proportion to the frequency, as shown by the hatched portion in FIG. 5C. However, the noise level N of the lower side band component $J_{-1}$ is attenuated by the equalizer 4 as mentioned above, and is shown by a dashed line in FIG. 5C Various proposals have been advanced for improving the S/N ratio by utilizing the lower side band more efficiently. One of such proposals is to utilize playback network circuit in which a low-pass filter with a linearly-decreasing frequency characteristic is used to process an FM signal at a uniform constant phase, thereby utilizing the lower side band more efficiently. Another proposal is to use a double limiter in which an FM signal is limited by a band-pass filter having a carrier frequency as a center frequency and then added to a lower side band component to effect the modulation in the high band, thereby utilizing the lower side band efficiently.

Accordingly, the previously mentioned proposals can improve the S/N ratio by utilizing the lower side band more efficiently; however, the improvement of the S/N ration is limited by the use of the lower side band component, and a distortion is also produced.

OBJECTS AND SUMMARY OF THE INVENTION

Accordingly, it is an object of the present invention to provide an apparatus for recording and reproducing a video signal which avoids the above-mentioned disadvantages of the prior art.

More specifically, it is an object of the present invention to provide an apparatus for recording and reproducing a video signal and in which a recording system thereof can remove or attenuate an undesired side band component in the wide band range, thereby suppressing a moire component.

Another object of the present invention is to provide an apparatus for recording and reproducing a video signal in which the reproducing system thereof can improve the signal-to-noise ration (S/N ratio).

According to an aspect of the invention, a recording system for recording a video signal on a record medium having a characteristic of a limiter comprises: frequency-modulating means to which an input video signal is fed for generating a sine wave modulated signal; phase rotating means connected to the frequency-modulating means for successively rotating a phase of an output signal of the frequency-modulating means so that the phase of a high-order frequency component is shifted by approximately 180 degrees; amplifying means connected to the output of the phase rotating means for amplifying the rotated output signal so as to enable the signal level thereof to be recorded; and recording means for recording the output signal of the amplifying means on the record medium.

According to another aspect of the invention, a reproducing system for reproducing a video signal recorded on a record medium, as aforesaid, comprises: pick-up means for retrieving the video signal recorded on the record medium; noise reduction means connected to the pick-up means and including at least two serially connected signal processing circuits, each having a limiter circuit with an input which receives an input signal for equalizing an amplitude of upper and lower side band components of the input signal, a high-pass filter connected to the limiter circuit so as to receive an output signal of the limiter circuit, a low-pass filter having an input connected to the input of the limiter circuit so as to receive its input therefrom and an adder for adding output signals of the high-pass filter and low-pass filter; and demodulating means for demodulating an output signal of the last of the serially arranged signal processing circuits.

The above, and other objects, features and advantages of the present invention will become apparent from the following detailed description of illustrative embodiments when read in conjunction with the accompanying drawings, wherein like reference numerals are used to designate the same or similar elements in the several views.

BRIEF DESCRIPTION OF THE DRAWINGS

FIGS. 1A to 1D are frequency spectrum diagrams used to explain the present invention;

DETAILED DESCRIPTION OF THE PREFERRED EMBODIMENTS

An apparatus for recording and reproducing a video signal according to an embodiment of the present invention will be described with reference to the drawings.

Figure 6:
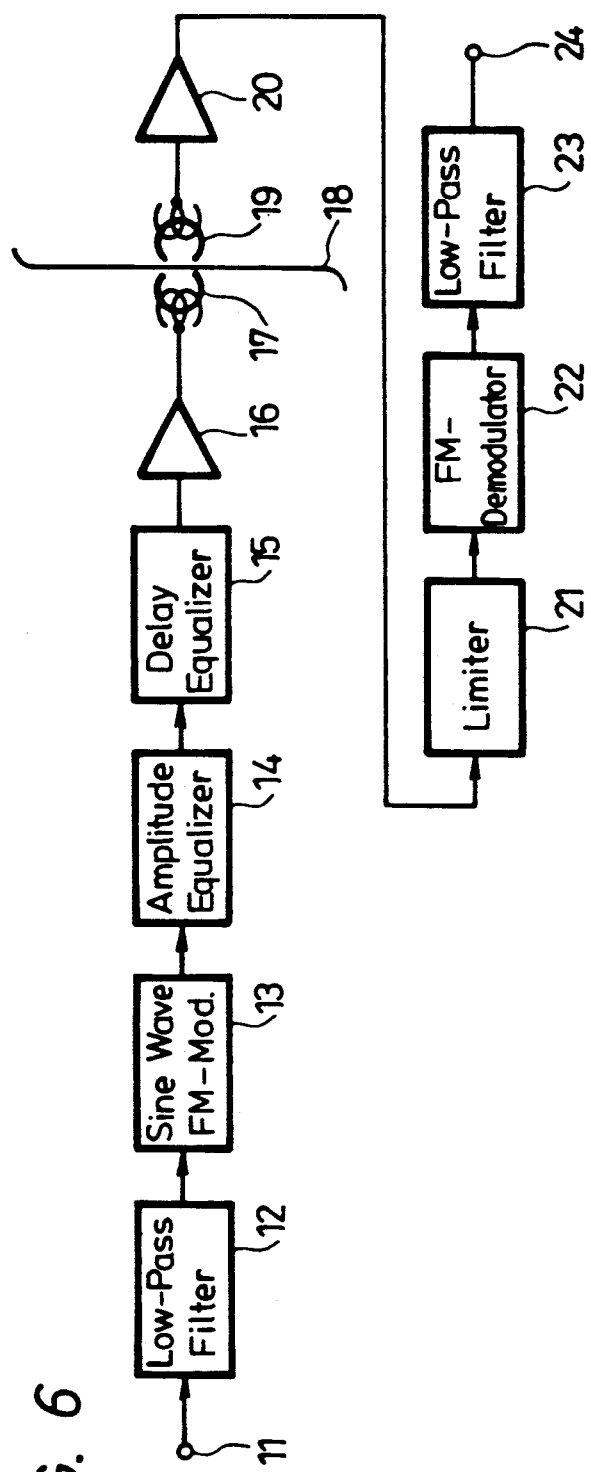
FIG. 6 is a block diagram illustrating an apparatus for recording and reproducing a signal on a record medium according to an embodiment of the present invention.

FIG. 6 illustrates in block form an embodiment of the present invention applied to a recording system of a video tape recorder.

Referring to FIG. 6 a luminance signal applied to an input terminal 11 is supplied through a low-pass filter 12 to a sine wave FM-modulator 13. The sine wave FM-modulator 13 might be one as disclosed, for example, in Japanese utility model publication No. 54-6375. As an alternative, the output signal from a square wave FM-modulator can be supplied to a low-pass filter wherein the higher harmonic components are removed.

The output signal from the FM-modulator 13 is supplied through an amplitude equalizer 14, a phase delay equalizer 15, a recording amplifier 16, and a magnetic recording head 17, whereby the signal is recorded on a magnetic tape 18.

The phase delay equalizer 15 shown in FIG. 6 will now be described in more detail with reference to FIG. 7.

Figure 7:
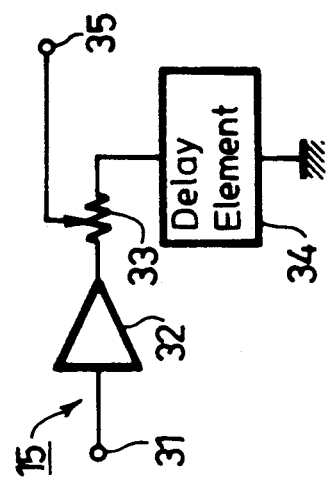
FIG. 7 is a circuit diagram illustrating a delay equalizer used in the recording system shown in FIG. 6.

In FIG. 7, there is shown an input terminal 31 which is connected in series to an amplifier 32, a variable resistor 33, a delay element 34 and to ground. The variable resistor 33 has a slider contact or a movable member, which is extended so as to provide an output terminal 35. By adjusting the delay time of the delay element 34 and the position of the movable member of the variable resistor 33, the phase delay equalizer 15 is given the phase characteristic shown in FIG. 1B. That is, a phase characteristic in which the phase of a signal is successively rotated so that the phase rotation difference between the upper and lower side band components of the second side band components $J_{\pm 2}$ is approximately 180 degrees.

Since the phase delay equalizer 15 has an amplitude characteristic as shown in FIG. 1C, an amplitude equalizer 14 is provided so as to compensate for this amplitude characteristic. The amplitude equalizer 14 will now be explained with reference to FIG. 8.

Figure 8:
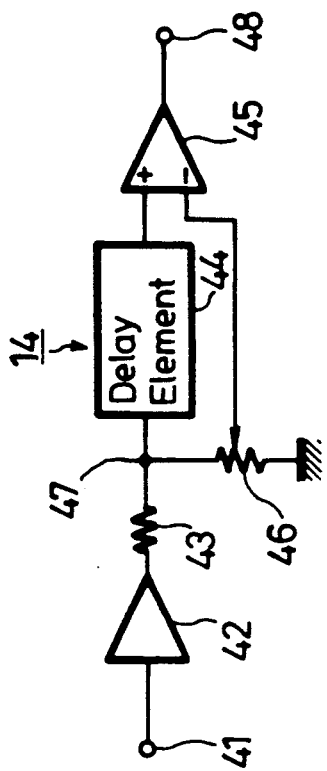
FIG. 8 is a circuit diagram illustrating an amplitude equalizer used in the recording system shown in FIG. 6.

Referring to FIG. 8, an input terminal 41 is connected in series to an amplifier 42 and a resistor 43. Resistor 43 is connected through junction 47 to delay element 44 which is coupled to a non-inverting input terminal of an operational amplifier 45. Junction 47 is grounded through a variable resistor 46 whose slider contact or movable member is connected to an inverting input terminal of the operational amplifier 45. An output terminal 48 is supplied from the output terminal of the operational amplifier 45. By adjusting the delay time of the delay element 44 and the position of the movable member of the variable resistor 46, amplitude equalizer 14 is given the amplitude characteristic shown in FIG. 1D, so as to compensate for the amplitude characteristic of the phase delay equalizer 15.

Referring back to FIG. 6, a video signal is reproduced from the magnetic tape 18 by a magnetic reproducing head 19 and supplied through a playback amplifier 20, a limiter 21 and an FM-demodulator 22. A luminance signal derived from the FM-demodulator 22 is then supplied through a low-pass filter 23 and is developed at an output terminal 24.

The recording system of this embodiment is constructed as previously described. That is, the phase of each component of the signal is successively rotated by the delay equalizer 15 so that the difference in the amount of phase rotation between the upper and lower side bands of the second side band components $J_{\pm 2}$ is approximately 180 degrees. This rotation results in the phases of the upper and lower side bands of the second side band components $J_{\pm 2}$ becoming approximately equal. The second side band components $J_{\pm 2}$ can now be removed when the video signal is recorded on the magnetic tape 18 which has a limiter characteristic. In addition, the phases of the upper and lower side bands of the third side band components $J_{\pm 3}$ are controlled so as to become equal to each other thereby allowing the third side band components $J_{\pm 3}$ to be reduced considerably when the video signal is recorded on the magnetic tape 18 which has the limiter characteristic by the magnetic recording head 17.

Furthermore, the phases of the upper and lower side bands of the first side band components $J_{\pm 1}$ are also controlled so as to become equal to each other thereby allowing the first side band components $J_{\pm 1}$ to be reduced. In this case, however, the phase rotation difference between the upper and lower side bands of the first side band components $J_{\pm 1}$ is small. Hence, the amount by which the first side band components $J_{\pm 1}$ are attenuated is small and therefore can be ignored.

Therefore, according to the present embodiment as set forth above, not only are the second side band components $J_{\pm 2}$ removed, but the third side band components $J_{\pm 3}$ are also considerably reduced. Hence, the unnecessary side band components in the wide band are removed or reduced thereby suppressing the occurrence of the moire component, thus preventing the image quality from being deteriorated.

Furthermore, in accordance with the present embodiment, the level of the first side band component $J_{-1}$ is reduced relative to the carrier frequency $J_0$, the possibility of overmodulation of the video signal is also reduced.

While the recording medium used in this embodiment is the magnetic tape 18 as described above, the present invention is not limited to the use of just magnetic tape, but can be applied to other recording systems wherein various kinds of magnetic recording medium having limiter characteristics are utilized for recording a video signal.

Figure 2A:
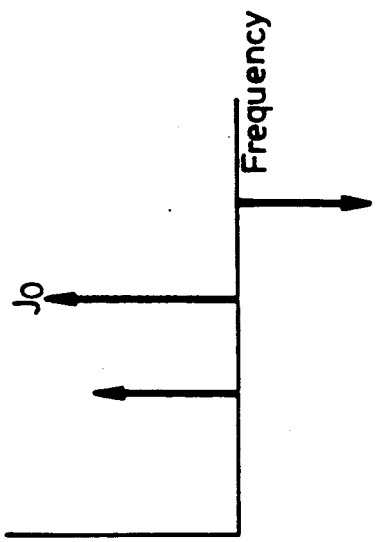
FIGS. 2A and 2B are frequency spectrum diagrams illustrating the frequency characteristics of an FM signal used to explain the prior art.
Figure 2B:
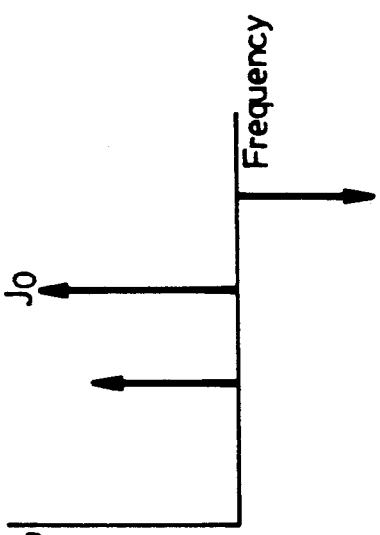
Figure 3A:
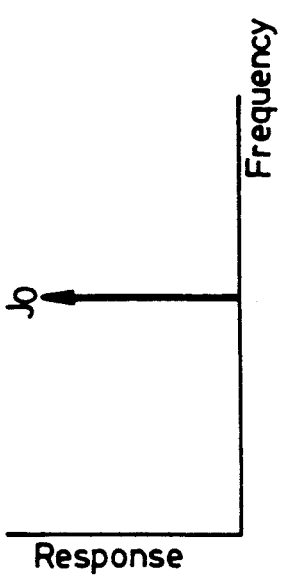
FIGS. 3A and 3B are frequency spectrum diagrams illustrating the frequency characteristic of an AM signal used to explain the background of the present invention.
Figure 3B:
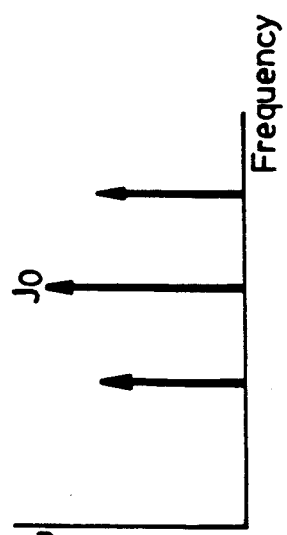
Figure 4:
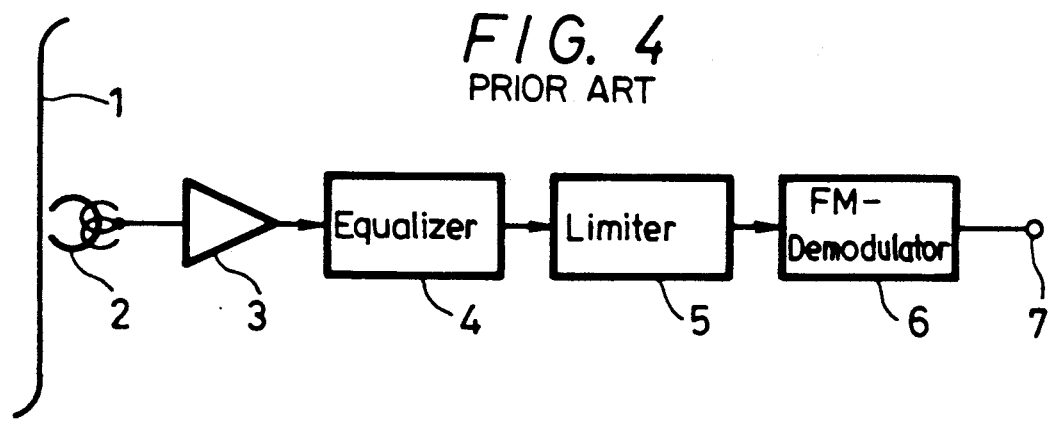
FIG. 4 is a block diagram showing a video tape recorder reproducing system according to the prior art.

A reproducing system of the video tape recorder wherein the present invention is applied will now be described with reference to FIG. 9 wherein, parts corresponding to similar parts in FIG. 4 are marked with the same reference numbers and therefore will not be described in detail.

Figure 5A:
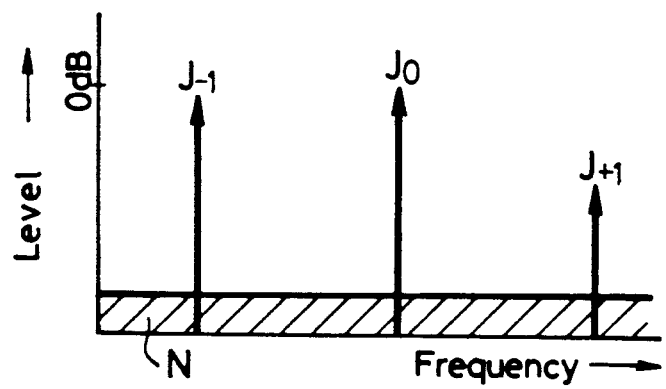
FIGS. 5A to 5C are frequency spectrum diagrams used to explain the operation of the prior-art reproducing system shown in FIG. 4.
Figure 5B:
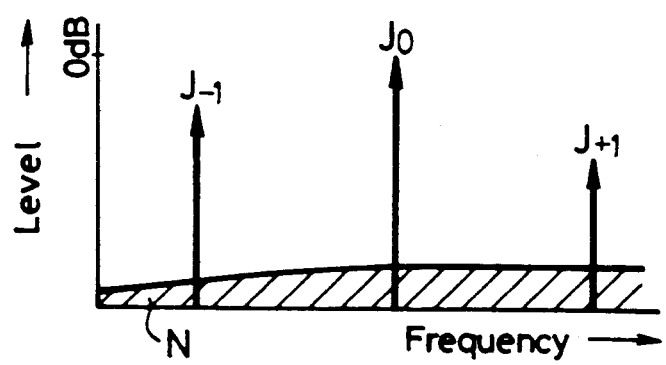
Figure 5C:
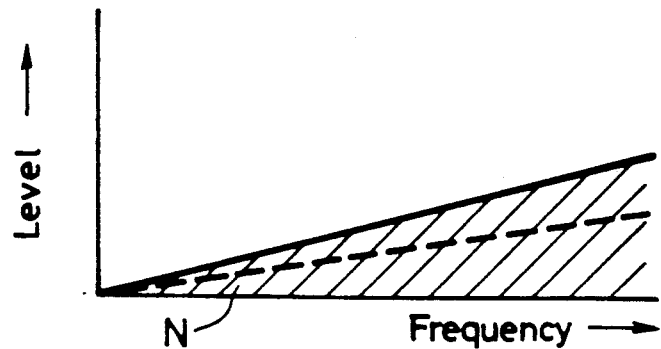
Figure 9:
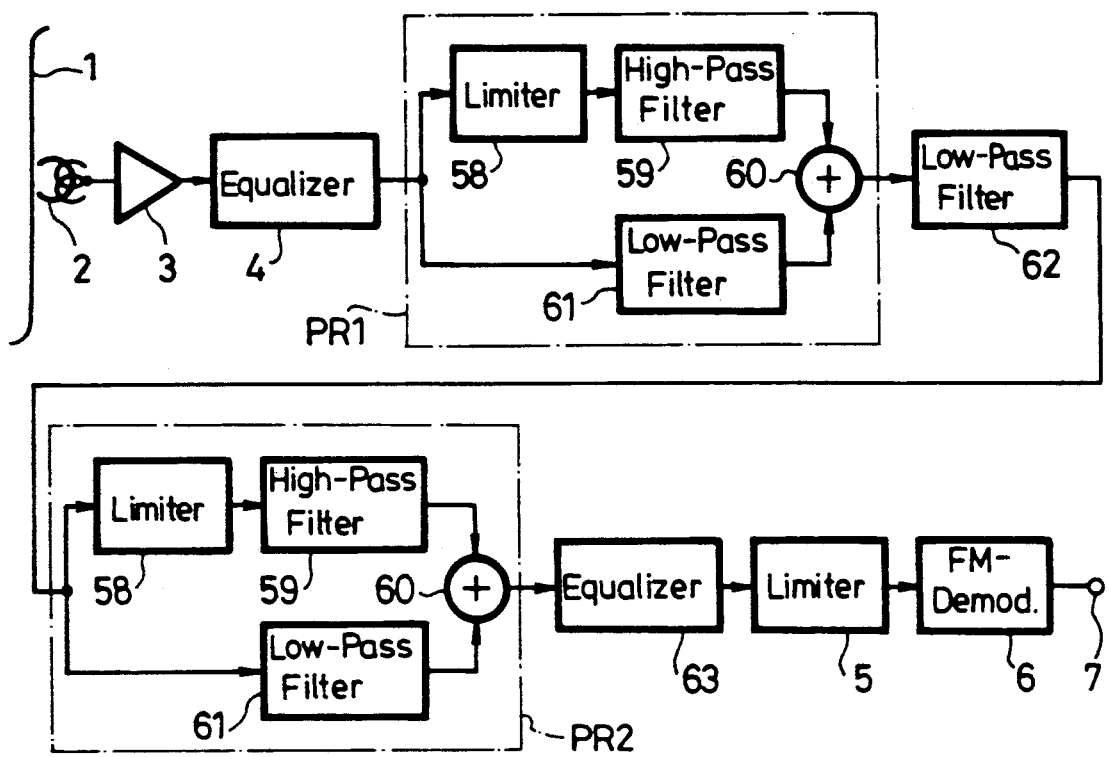
FIG. 9 is a block diagram illustrating a reproducing system apparatus according to another embodiment of the present invention.
Figure 10A:
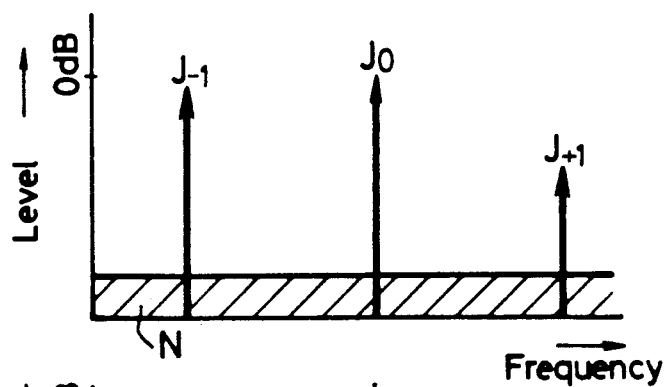
FIG. 10A to 10J are frequency spectrum diagrams used to explain the operation of an embodiment of the present invention.
Figure 10B:
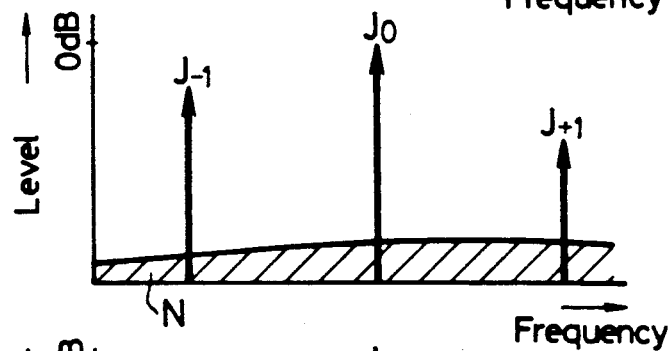
Figure 10C:
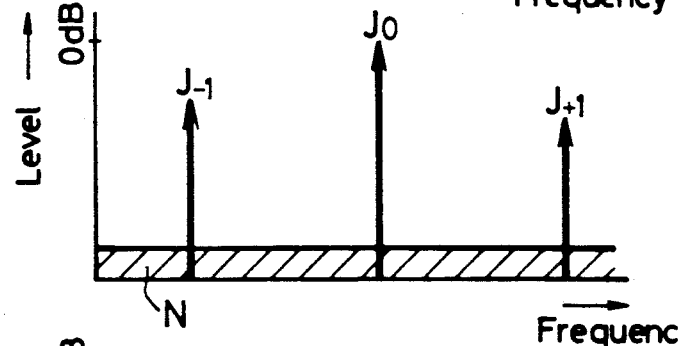

As shown in FIG. 9, the output signal of the equalizer 4 is supplied to a limiter 58 wherein the signal is limited in amplitude characteristic. The limiter 58 forms a part of a signal processing circuit PR1 which will be described later. As shown in FIG. 10C, the limiting effect due to limiter 58 lowers the level of the lower side band $J_{-1}$ while raising the level of the upper side band $J_{+1}$. Herein, it should be noted that the actual phase difference between the upper side band component $J_{+1}$ and lower side ban component $J_{-1}$ is approximately 180 degrees, notwithstanding the illustration in FIG. 10. However, the noise N still occurs in both the upper and lower side band components. FIGS. 10A and 10B illustrate the reproduced FM signal supplied to the equalizer 4 and the output signal of the equalizer 4, respectively, which are the same as the signals shown in FIGS. 5A and 5B.

Figure 11:
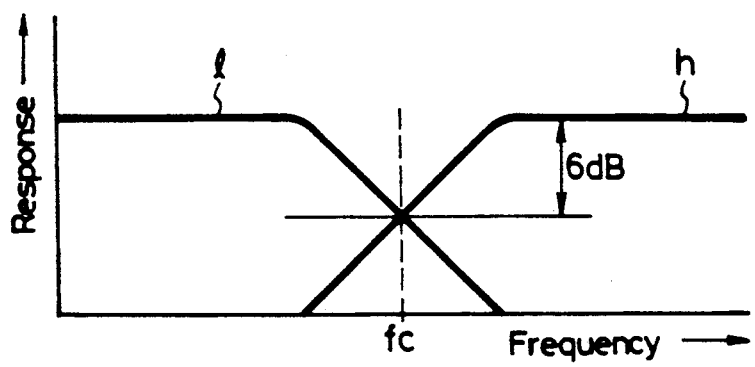
FIG. 11 is a frequency spectrum diagram used to explain the characteristics of a high-pass filter circuit and a low-pass filter circuit used in the present invention.
Figure 10D:
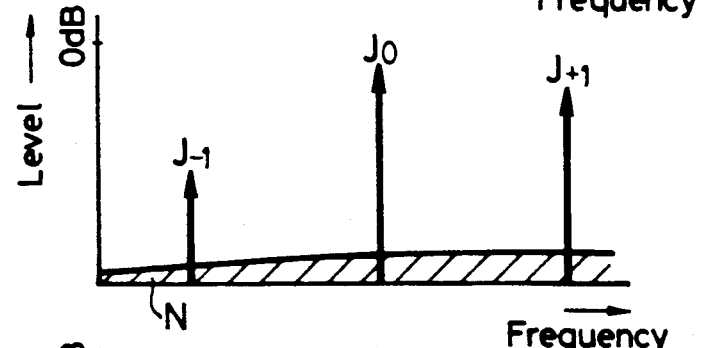

The output signal from the limiter 58 is supplied to a highpass filter 59 which is also contained within the signal processing circuit PR1. High-pass filter 59 possesses a filter characteristic that attenuates the signal from limiter 58 by 6 dB at a frequency fc of the carrier $J_0$ as represented by a solid curve h in FIG. 11. Hence, the high-pass filter 59 generates an output signal in which the lower side band $J_{-1}$ is attenuated as shown in FIG. 10D. The output signal of the high-pass filter 59 is fed to an adder 60 contained within circuit PR1.

Figure 10E:
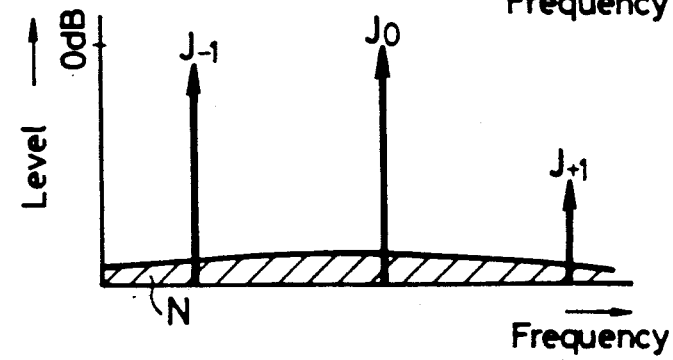

The output signal of the equalizer 4 is also supplied to a low-pass filter 61, which is also contained within circuit PR1. The low-pass filter 61 has a filter characteristic which attenuates the output signal from equalizer 4 by 6 dB at a frequency fc of the carrier $J_0$ as represented by a solid curve 1 in FIG. 11. In other words, the low-pass filter 61 and the high-pass filter 59 are made complementary to each other in terms of the filter characteristic. Hence, the low-pass filter 61 generates an output signal in which the upper side band $J_{+1}$ is attenuated as shown in FIG. 10E. This output signal of the low-pass filter 61 is supplied to the adder 60.

Figure 10F:
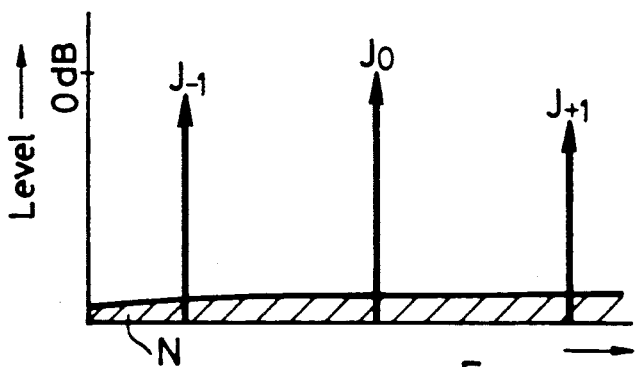
Figure 10G:
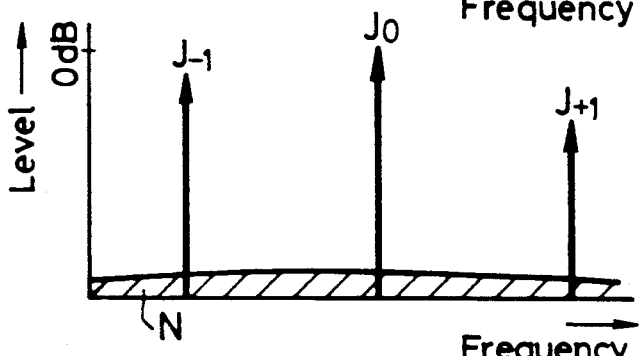

The adder 60 adds the output signals of the high-pass filter 59 and the low-pass filter 61 and then generates a signal as shown in FIG. 10F. As compared with the output signal of the equalizer 4 shown in FIG. 10B, the levels of the lower side band $J_{-1}$ and of the upper side band $J_{+1}$ of the adder output signal are increased and the modulation degree is increased. Also, the levels of the lower side band $J_{-1}$ and of the upper side band $J_{+1}$ become closer to each other. The output signal of the adder 60, that is, the output signal from the signal processing circuit PR1 is supplied to a low-pass filter 62 wherein, the level of the upper side band $J_{+1}$ is attenuated as shown in FIG. 10G.

Figure 10H:
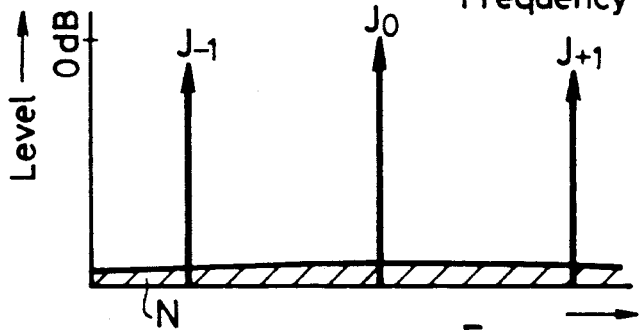

The output signal of the low-pass filter 62 is supplied to a second signal processing circuit PR2 which is constructed similarly to the above-mentioned signal processing circuit PR1. In circuit PR2, signal processing similar to that performed in circuit PR1 is performed, thereby producing a signal as shown in FIG. 10H, wherein the levels of the lower side band $J_{-1}$ and of the upper side band $J_{+1}$ are increased relative to the carrier $J_0$ and the modulation degree is increased. A comparison between the output signal of circuit PR2 and that of circuit PR1, FIG. 10F, shows that in circuit PR2 the S/N ratio of the lower side band $J_{-1}$ and the upper side band $J_{+1}$ is improved. In addition, the levels of the lower side band $J_{-1}$ and of the upper side band $J_{+1}$ become closer to each other.

Figure 10I:
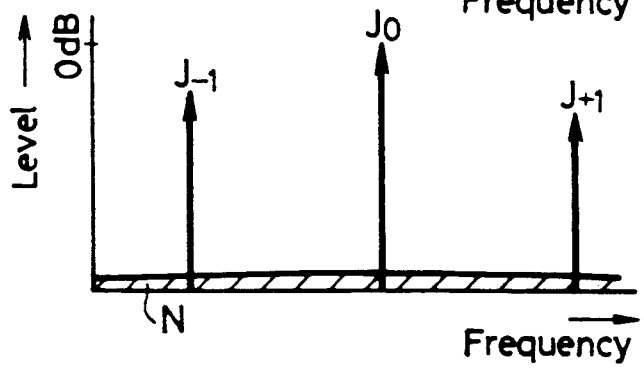

In order to avoid over-modulation, the output signal from circuit PR2 is supplied to an equalizer 63 which attenuates the levels of the lower side band $J_{-1}$ and the upper side band $J_{+1}$ as shown in FIG. 10I. Simultaneously, the noise levels N contained in the lower side band $J_{-1}$ and the upper side band $J_{+1}$ are also attenuated by the equalizer 63.

The output signal from the equalizer 63 is supplied through the limiter 5 to the FM-demodulator 6 wherein reproduced video signal is developed and supplied from the output terminal of the FM-demodulator 6 to output terminal 7.

Figure 10J:
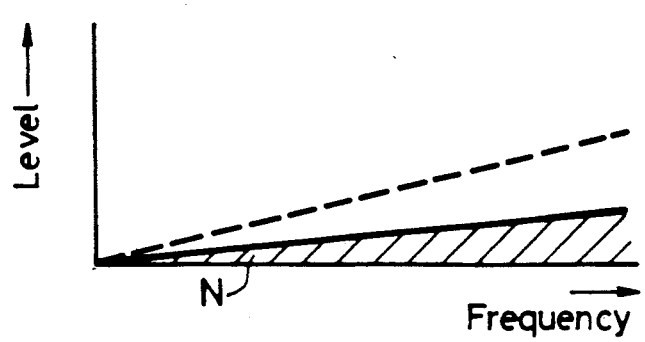

Therefore, according to the second embodiment of the present invention, the lower side band $J_{-1}$ and the upper side band $J_{+1}$ of the reproduced FM signal are supplied to two serially connected signal processing circuits PR1 an PR2. Each signal processing circuit consists of a limiter 58 serially connected to high-pass filter 59 which are connected in parallel to low-pass filter 61. The filter characteristics of high-pass filter 59 and low-pass filter 61 are complementary to each other. The output from filters 59 and 61 are added together in adder 60. The levels of the lower side band $J_{-1}$ and upper side band $J_{+1}$ from the output of signal processing circuit PR2 are high, as shown in FIG. 10H, which increases the modulation degree and improves the S/N ratio. The levels of lower side band $J_{-1}$ and upper side band $J_{+1}$ are then attenuated by the equalizer 63 as shown in FIG. 10I, wherein the noise level N is also lowered. The output signal from equalizer 63 is demodulated by FM-demodulator 6. The noise level of the output signal from FM-demodulator 6 is illustrated in FIG. 10J. It is to be noted that this noise level N is lower than the noise level N in the prior art example, which is shown by a dash line in FIG. 10J. Hence in this embodiment the S/N ratio is improved, that is, increased. Therefore, if it is desired to just maintain the original lower value of the S/N ratio, this embodiment allows the video signal band being recorded to be widened.

Moreover, since the low-pass filter 61 and the high-pass filter 59 are complementary in terms of filter characteristic, it is possible to suppress distortion components.

Furthermore, since the levels of the lower side band $J_{-1}$ and of the upper side band $J_{+1}$ of the signal supplied to the FM-demodulator 6 are reduced relative to the level of the carrier frequency $J_0$, as shown in FIG. 10I, the video signal is difficult to be affected by over-modulation.

While only two signal processing circuits, PR1 and PR2, are connected in series in the embodiment shown in FIG. 9, the S/N ration can be further improved by increasing the number of the signal processing circuits.

Furthermore, while in the second embodiment the present invention is applied to the reproducing system of the video tape recorder, the present invention can similarly be applied to other FM-demodulating systems.

Although preferred embodiments of the invention have been described in detail herein with reference to the accompanying drawings, it is to be understood that the invention is not limited to those precise embodiments, and that various changes and modification may be effected therein by one skilled in the art without departing from the scope or spirit of the invention as defined in the appended claims.

I claim as my invention:

1. An apparatus for recording and reproducing a video luminance signal comprising:

a record medium providing a transfer characteristic similar to that of a limiter in respect to a signal recorded on, and reproduced from said record medium;

frequency-modulating means for frequency-modulating an input video luminance signal so that a sine wave modulated signal is generated thereby as an output signal having a base band and low-order and high-order upper and lower side bands; p1 phase equalizer means connected to said frequency-modulating means for successively rotating a phase of said output signal of the frequency-modulating means, so that phases of said high-order upper and lower side bands are relatively shifted by about 180 degrees and brought into substantial equality with each other;

amplitude equalizer means for compensating for variations in the amplitude of the phase-rotated output signal caused by said phase equalizer means so that the level of the resulting amplified signal is suitable for the recording thereof;

means for recording said amplified signal from said amplifying means on the record medium;

pick-up means for reproducing said signal recorded on the record medium and providing therefrom a reproduced video luminance signal which includes noise and in which said high-order side bands are suppressed by said transfer characteristic similar to that of a limiter;

noise reducing means connected to said pick-up means for reducing said noise included in said reproduced video luminance signal, said noise reducing means including at least first and second serially connected signal processing circuits;

each of said signal processing circuits having a limiter which receives a respective input signal for equalizing amplitudes of upper and lower side band components of said respective input signal, a high-pass filter connected in series to said limiter of the respective signal processing circuit so as to receive an output signal of said limiter, a low-pass filter also connected to receive said input signal received by said limiter of said respective signal processing circuit and an adder for adding output signal of said high-pass filter and low-pass filter, respectively; and means for frequency demodulating an output signal or said second signal processing circuit.

2. An apparatus for recording and reproducing a video luminance signal comprising:

a record medium providing a transfer characteristic similar to that of a limiter in respect to a signal recorded on, and reproduced from said record medium;

frequency-modulating means for frequency-modulating an input video luminance signal so that a sine wave modulated signal is generated thereby as an output signal having a base band and low-order and high-order upper and lower side bands;

phase equalizer means connected to said frequency-modulating means for successively rotating a phase of said output signal of the frequency-modulating means so that phases of said high-order upper and lower side bands are relatively shifted by about 180 degrees and brought into substantial equality with each other;

amplitude equalizer means compensating for variations in the amplitude of the phase-rotated output signal caused by said phase equalizer means so that the level of the resulting amplitude equalized signal is suitable for the recording thereof;

means for recording said amplitude equalized signal on the record medium; and pick-up means for reproducing said signal recorded on the record medium and providing therefrom a reproduced video luminance signal in which said high-order side bands are suppressed by said transfer characteristic similar to that of a limiter.

* * * * *